July 4, 1933.    H. A. WEINLICH    1,917,002
DEBIT AND CREDIT TABULATOR
Filed March 12, 1927
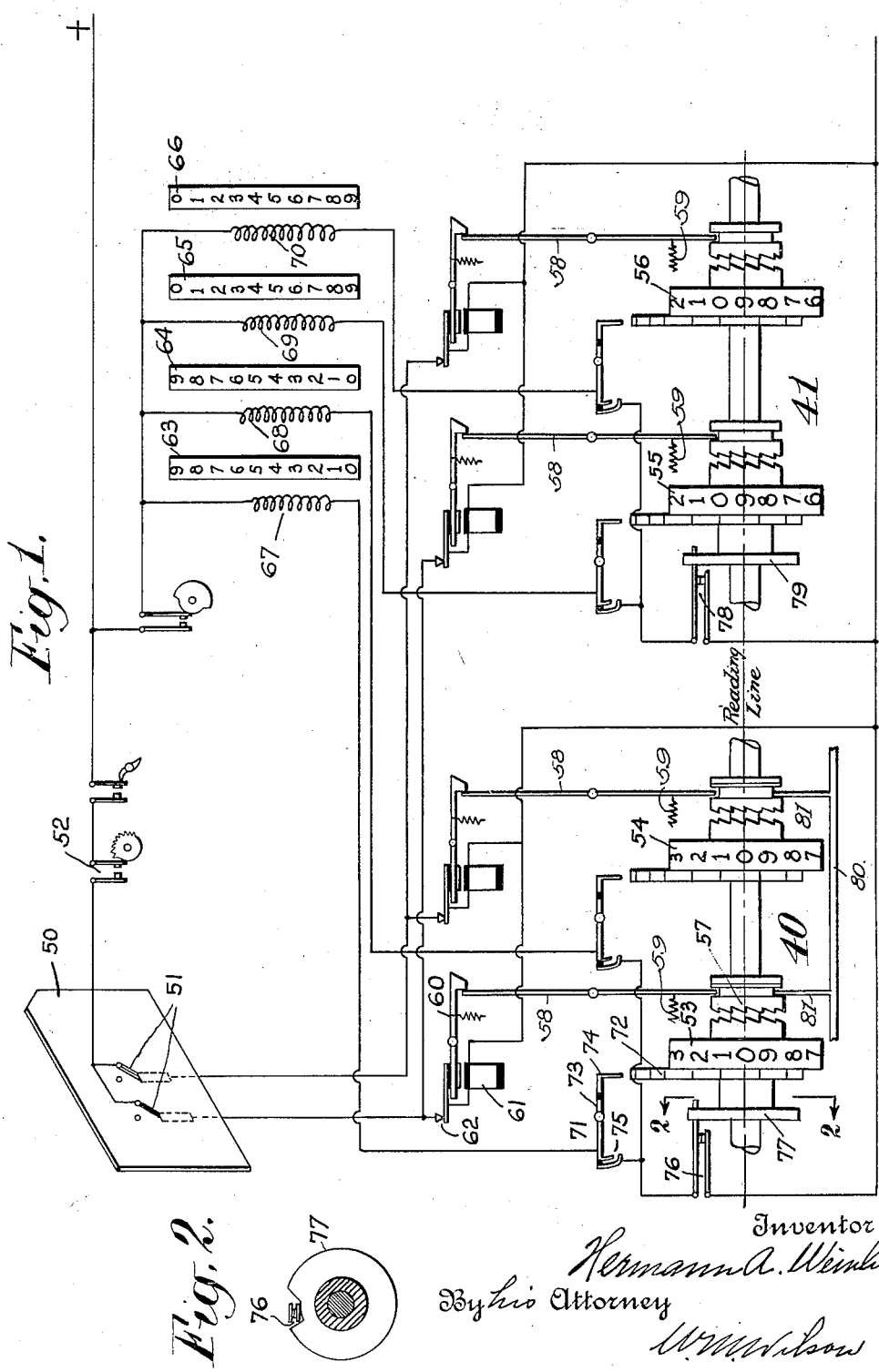

Patented July 4, 1933

1,917,002

UNITED STATES PATENT OFFICE

HERMANN ADALBERT WEINLICH, OF BERLIN, GERMANY, ASSIGNOR TO THE TABULATING MACHINE COMPANY, OF ENDICOTT, NEW YORK, A CORPORATION OF NEW JERSEY

DEBIT AND CREDIT TABULATOR

Application filed March 12, 1927, Serial No. 174,780, and in Germany March 20, 1926.

The invention relates to accounting machines, and more particularly to record controlled machines which may subtract as well as add.

When tabulating machines are used for deriving statements of accounts with customers it is desirable to not only automatically enter items into the tabulating machine to obtain totals, but also, to obtain the differences or balances. This invention relates to a constructional arrangement shown, for illustrative purposes, in connection with a tabulating machine which is adapted for this purpose. The invention makes use of the fact that the subtraction calculations can be made as accumulating calculations provided that the items of one kind are used in the calculation as direct numbers or entered positively, whereas, the items of another kind are used as complements or entered negatively, and that, if necessary, the complementary balance which then is found is converted to a true number.

For instance, if it is desired to determine the difference between the numbers 368 and 243, which is 125, then this subtraction can be made as an accumulation by adding to the direct number 368 the tens complement of 243, that is to say . . . . 99757.

```
       368
 . . . . 99757
 ─────────────
 . . . . 00125
``` or, alternatively,

```
 . . . . 99632
       243
 ─────────────
 . . . . 99875
``` of which the tens complement is—00125—the true number.

The determination of balances can be effected in this way by a tabulating machine if the machine is provided with not only printing devices, but also with a balancing mechanism wherein the several items are transmitted, depending whether they are debit or credit items, the former, in the example herein selected, entered as direct numbers and the latter as tens complements.

If one proceeds in this way the balancing mechanism when positive or above zero would show, in one case, the true value of this balance and in the other case would be negative or below zero and show the complement of such balance depending on whether the resulting balance is, respectively, a debit or credit balance. Such a way of indicating the balance would be unsatisfactory for practical use.

In order to obtain balances which always represent as true numbers the balance, irrespective of whether the result is positive or negative, the tabulating machine, according to this invention, is provided with two balance devices so arranged that when a debit balance occurs, the debit balance device shows the true value of the balance or when a credit balance is secured, a nines complement will be exhibited on the credit balance device. Such balance devices have coordinated therewith two reversely arranged sets of printing devices, the set of one type being in a nine complementary relation with the other so that when a negative result is derived, determined by a complementary condition of the credit balance device, the set of type which is arranged complementary to the reading of the credit balance device will be selected to convert the complementary result on the credit balance device to a true number.

If two accumulators of a printing tabulating machine are used as balancing devices and items of the one class (debits) are transmitted as direct numbers to both, and the items (credits) of the other class as tens complements to both, each of the adding wheels of one balance device, in normal position, being set to represent zero, and each of the adding wheels of the other being set to represent 9, then in deriving a positive balance, only the device which is set at zero indicates the true number of a debit balance correctly and is used for printing the result as a true number, whereas, in obtaining a credit balance both indicate a complementary result but only the credit balance device is selected for printing. This selection is accomplished by determining whether the highest order adding wheels of both the debit or credit balance devices stand at nine or zero when the final result has been secured. Otherwise, if both balances were printed, then one would be correctly printed as a true value and the other would be incorrectly printed. To secure the proper result, the type which are controlled by the credit balance device are complementally arranged with respect to the other set of type, so that it is possible to obtain printing of the complement representing a credit balance as a true number. In this way a tabulating machine may be arranged to print as true numbers debit balances as well as credit balances.

According to what has been stated above, it is necessary that the values of items of one kind (credits) be entered as tens complements into the balancing devices.

This can be effected by controlling the balance devices into which complements are to be transmitted by complementally punched cards.

The tens complement of a number, as the term "tens complement" is ordinarily meant, is that value which supplements a number to the next higher power of the number 10. For example, the tens complement of the number 368 is the amount which must be added to this number in order to make 1000 or $10^3$, that is the tens complement is 632. It follows then that the several digits of an item should be supplemented each to 9 with exception of the first significant figure which should be supplemented to 10. If the number was 360, the tens complement would be 640, as is well understood.

The credit items which are complementally punched in the cards are transmitted as tens complements to both balance devices. It is obvious, with respect to both of the balance devices, that on each transmission of a complementally punched amount to the adding wheels, the tens complement is transmitted to both balance devices.

The complementary balance which appears in the balance device set at nine is always equal to the nines complement of the true number so that by the complementary coordination of the type of one of the printing devices with the adding wheels, the balance as a true number will be printed. This may be explained in connection with an example. Assume that the items:—

```
         267
        3715
          12
making a total 3994
``` are to be transmitted to the credit balance device and that these items are complementally punched as tens complements in the cards, that is as:—

```
       99733
       96285
       99988
```

If now the number wheels of the accumulator are all set to 9, as above stated, and if, at each transmission of an item to the balance device the tens complement of each item is entered, then one has the following:—

```
       99999
       99733
       96285
       99988
       ─────
       96005
```

By the printing bars, having the complementally arrange type, then the nines complement, 3994, of the complementary result 96005 will be printed which is the balance as a true number of the three items selected.

In order to also give an example of obtaining both balances by the use of two accumulators of a tabulating machine used as a pair as balance devices, it may be assumed that the balance of the complementally punched items mentioned in the above example, namely; 267; 3715 and 12 representing credit items, and of the items; 5618 and 326, forming debit items, is desired. The debit balance device has been set, as above stated, to —00000— and the credit balance device to —99999—. One then gets in the balancing devices the following:

*Example I*

| Debit Balance Device I | Credit Balance Device II |
|---|---|
| 00000 | 99999 |
| 99733 | 99733 |
| 96285 | 96285 |
| 99988 | 99988 |
| 5618 | 5618 |
| 326 | 326 |
| 01950 | 01949 |

The amount secured in the debit balance device I, showing the characteristic mark of a true value, by selecting means to be later described, this amount is the true balance and is printed, whereas, the amount in the credit balance device II remains unused because it does not show by the presence of a nine in the highest order a complementary result.

A different situation arises when the credit items are greater numerically than the debit items are, for example, 763; 219. Then the algebraic summation is as follows:

*Example II*

| Debit Balance Device I | Credit Balance Device II |
|---|---|
| 00000 | 99999 |
| 99733 | 99733 |
| 96285 | 96285 |
| 99988 | 99988 |
| 763 | 763 |
| 219 | 219 |
| 96988 | 96987 |

The result in the debit balance device I shows the characteristic of a complementary value and determines that it is not the result of this balance device which is to be selected, by means to be described, but the result of the credit balance device II, the nines complement of the result of the credit balance device being printed by the complementally displaced type. The balance will be printed as a true value or 03012.

The printing of the balances by the two sets of printing devices in different fields, under control of either one or the other balance device, shows by the position of the printed balance if the balance is a debit balance or a credit balance.

The formation of balances by adding items as direct numbers and tens complements does not absolutely require that the items which are to be transmitted into the balancing devices as tens complements be complementally punched on the cards. It is possible to use cards wherein the items are in both cases punched as direct numbers, and debit and credit items still entered additively or subtractively by the complemental process, in the manner shown and claimed in the copending application Serial No. 542,285, filed June 5, 1931.

The use of such cards has not only the advantage that certain cards do not have to be specially punched to represent complements but also have the advantage of permitting the entry of items as direct numbers in the selected one of the two item accumulators.

In order to transmit tens complements of the values of items to the balance device, if said values are punched as direct numbers in the cards provisions must be made for, as illustrated in Serial No. 542,285 for selectively controlling the entry in the balance device by classification designations on the cards indicating the different classes of items. That is, cards whose items, represented by the direct number punched, to be transmitted as a complement must either bear or lack some controlling designation which will selectively control the item entering mechanism of the machine to effect the entry of the tens complement. Ordinarily, cards which represent debit or credit amounts are classified by placing a distinguishing perforation on one or the other card usually in advance of the column where an item representing perforation is located.

The invention is illustrated in the accompanying drawing in which:—

Fig. 1 illustrates diagrammatically a machine for operating upon cards of different classes, cards of one class, for example, credit cards being punched as tens complements of the items, and a card of another class, for example, a debit card, being punched as a direct number.

Fig. 2 is a section on line 2—2 of Fig. 1, being a detail of one of the selecting devices for the printing mechanisms.

Referring now to Fig. 1, it will be understood that the showing has been made very diagrammatic as an aid to an easy understanding of the invention. The control mechanisms, accumulating mechanisms, total taking mechanism and printers in their constructional details may be substantially as shown in United States patent to Lake, Reissue No. 16,304, March 30, 1926.

A controlling card 50 is shown as having controlling perforations in cooperative relationship with the usual analyzing brushes 51. It will be assumed that cards of one classification, for example, credit cards, are punched to represent the tens complement of the item which they represent and cards representing debit items are punched as direct numbers corresponding in value to the items which they represent. The circuits to the analyzing brushes are closed instantaneously for each index point position of the passing card through cam controlled contacts 52.

Two accumulators employed as a pair of balance devices are shown at 40 and 41, the debit balance 40 comprising a series of adding elements of which two 53 and 54 are shown, and the credit balance device 41 also illustrated by two adding elements 55 and 56. These adding elements are freely mounted on a rotating shaft and are clutched to the shaft for operation by suitable clutches, as is usual in the art. The clutch for the element 53 includes an element designated by numeral 57, which is splined to the shaft and rotates with it, but may be moved longitudinally thereof into clutching engagement with the adding element 53. This movable clutch element is constantly urged into clutching position by a pivoted lever 58 under the action of a spring 59. The lever is normally held by a latch 60 to prevent clutching of the companion clutch elements. When the analyzing brush 51, corresponding to this denominational order, encounters a perforation in a controlling record, a circuit is established momentarily through the adding magnet 61, which, thus releases the latch 60, and permits the clutch element 57 to engage the related adding element 53 rotating the adding element by means of the shaft. This rotation of the adding element continues until a given point in the machine cycle when all clutches which are engaged are declutched simultaneously whereby the numeral represented by an index point in a card column will be entered in a corresponding adding element. The declutching operation may be effected by means of a reciprocable bar 80 having a lug 81 coacting with the groove of the clutch element 57. The bar 80, of course, has a plurality of lugs 81 to simultaneously shift all the clutch elements 57 by means shown and fully described in the Lake Patent #1,307,740. Incidentally the release of the latch 60 by the magnet 61 breaks the circuit of the magnet at the contacts 62 to prevent the possibility of sparking at the analyzing brushes.

The balance devices 40 and 41 are identical in construction and operation but the adding elements of the balance device 40 are normally set so that the zeros are presented at the reading line to constitute a normal position, while the adding elements of balance device 41 are normally set so that the nines are exhibited at the reading line, constituting an off-normal position. It is understood, of course, that each balance device comprises a sufficient number of adding elements to make its capacity, as compared with the magnitude of number involved in the problems performed thereon, sufficiently great so as to display a series of nines to the left when a negative condition is obtained, or a series of zeros when a positive condition obtains. As the cards pass through the machine their perforations will effect entry of debit items as direct numbers into both balance devices 40 and 41, the cards representing credit items will enter the tens complements of the credit items into both balance devices. After a number of cards have passed and the result is positive the debit balance device 40 indicates a debit balance as a true number and the credit balance device 41 one less than the true number. If the result is negative the balance device 40 represents a tens complement of the true number representing a credit balance, and balance device 41 represents a nines complement of the true number representing a credit balance. If a true number stands on the balance device 40, as indicated by a zero on the higher order adding element, this number will be printed in the usual manner under control of the debit balance device. If a tens complement stands on the debit balance device 40, as indicated by nines on the higher order adding elements, total printing is not effected from this balance device 40 but from the balance device 41, which, it will be recalled always registers one less (or the nines complement) than the tens complement standing on the balance device 40. This difference of one gives a nine complement and permits printing of a true number from type bars on which the printing type are reversed with respect to those on the usual type bars. That is, the "0" type is in the position usually occupied by the "9" type, the "1" type is in the position usually occupied by the "8" type, etc. The type bars are indicated at 63, 64, 65 and 66 with corresponding type selecting magnets 67, 68, 69, and 70. It will be understood from the Lake patent Reissue 16,304 referred to, that these type bars, during printing cycles, rise in unison, each presenting its several type successively to printing position and the bars are stopped at the proper points by the associated type selecting magnets so that the proper type on each bar is selected for printing. The type selecting magnet 67 is controlled by a well known type of total taking mechanism, indicated generally at 71 but more fully shown and explained in the Lake Reissue patent 16,304 and particularly in Fig. 22 of the Lake Patent #1,822,594, dated September 8, 1931, and which consists of a stepped cam 72 fixed or geared to the adding element 53 so that its position always corresponds to the registering indication of the adding element. During total taking cycles pivoted lever 73 is rocked until a feeler finger 74 encounters a step of the cam 72 whereupon contacts 75 engage and effect energization of the type selecting magnets 67 to select the proper type for printing. This structure is likewise fully described in the United States patent to Lake, Reissue 16,304 and the Lake patent #1,822,594 referred to, and is merely shown diagrammatically in the drawing. The remaining type selecting magnets are controlled by identical total taking mechanisms.

The printing bars 63 and 64 are indicated with their type in the usual order and printing from accumulator 40 is always effected by these bars. The bars 65 and 66 have their type arranged in a reverse, or a nine complementary order with respect to bars 63 and 64 and printing from the balance device 41 is always effected by these bars. Printing is effected from the balance device 41 through the bars 65 and 66 if a complementary number stands on the balance devices 40 and 41, as indicated by nines on the adding elements of the higher orders, while if a true debit balance stands on the balance device 40 and 41, as indicated by zeros on the higher order adding elements on both balance devices, printing is to be effected by the printing bars 63 and 64 from the balance device 40. The control circuits including the contacts 75 for the type selecting magnets 67 and 68 include a pair of cam controlled spring contacts 76 which are in closed position when the highest order adding element 53 of balance device 40 is in zero position but which are opened by the concentric portion of a cam 77 rigidly attached to the adding element of the highest order when this adding element is in any other registering position. The control contacts for the type selecting magnets 69 and 70 are similarly controlled by cam contacts 78 operated by a cam 79 on the adding element 55 of the highest order of the balance device 41. The cam 79 is similar to the cam 77 but effects closure of the contacts 78 when the highest order adding element 55 is in a nine position and permits these contacts to open when the element is in any other position.

If nines stand on the adding elements of the higher orders of each of the balance devices, then the contacts 76 will be open to cut the type selecting magnets 67 and 68 out of circuit and the contacts 78 will be closed whereupon magnets 69 and 70 will be selected to print the credit balance by the type bars 65 and 66 under control of credit balance device 41. These bars will print the true credit balance represented by the nines complement on balance device 41 as the balance device 41 from which they are controlled always registers one less than the tens complement. If zeros stand on the adding elements of the higher orders of each of the balance devices 40 and 41 then contacts 78 will be open to cut the type selecting magnets 69 and 70 out of circuit and the contacts 76 will be closed whereupon magnets 67 and 68 will be selected to print the debit balance by the type bars 63 and 64 under control of the debit balance device 40. These bars will print the debit balance as a true number as the true number stands on the debit balance device and the type on the bars are correspondingly arranged.

In the event that the debit items equal the credit items numerically both balance devices will indicate the digits which are at normal position, namely, 00000, and, 99999, respectively. When a total is taken, since contacts 76 of the debit balance device 41 are closed because the highest order adding wheel 53 stands at zero, printing bars 63 and 64 will print the corresponding result or —00000. Since contacts 78 are also closed due to the standing of the highest order adding wheel 55 of credit balance device 41 at nine the printing bars 65 and 66 will print the nines complement of the result (99999) on balance device 41, or—00000. Printing of both indicates to the operator equality numerically of debit and credit items.

What is claimed is:

1. An accounting machine including an accumulating mechanism, means for entering certain items as direct numbers and other items as the tens complement to add and subtract, printing mechanism controlled by said accumulating mechanism and comprising two sets of printing devices, the type of one set of devices being complementally arranged with respect to the type of the other set of devices, and means controlled by the accumulating mechanism for automatically selecting one or the other of said sets of devices for a printing operation in accordance with whether the accumulating mechanism is in a positive or negative condition.

2. An accounting machine including a pair of accumulators, means for entering certain items as direct numbers and other items as the tens complement to add and subtract on each of said accumulators concurrently whereby one of said accumulators will indicate a true result when the additive amounts exceed the subtractive amounts and the other a nines complement of the true result when the subtractive amounts exceed the additive amounts, two sets of printing devices, one set related to each accumulator, one set having its type arranged in a nines complementary relation with respect to the other set of type, and means for selecting either of said sets of printing devices for control by one of the accumulators in accordance with whether the accumulators represent a positive or negative condition.

3. An accounting machine comprising a pair of accumulators one of which comprises adding elements initially set to a normal position and the other of which comprises adding elements initially set to an off-normal position, means for additively and subtractively entering numbers in both accumulators, mechanism controlled by said accumulators for manifesting balances standing on each accumulator, and selective means for selecting one of said accumulators for the result manifesting operation by said mechanism when the balance is represented as a true number or the other accumulator when the balance is represented as a nines complement.

4. An accounting machine comprising a pair of accumulators one of which comprises adding elements set to a zero position and the other of which comprises elements set to the nine position, means for additively or subtractively entering numbers in both accumulators, a separate printing device controlled by each accumulator, one having reversely arranged type with respect to the other, and means for selecting for operation one or the other of said printing devices in accordance with a balance as a true number on one accumulator, or a nines complementary balance on the other of said accumulators.

5. In a machine of the class described adapted to be controlled by record cards each having manifested thereon either positive or negative items, analyzing devices cooperating with said record cards, an accumulating mechanism comprising adding wheels, means directly controlled by said analyzing devices for operating the adding wheels of the accumulating mechanism in the same direction to enter both the positive and negative items, and means controlled by the accumulating mechanism for giving a balance of the positive and negative items as a true number irrespective of which items are greater numerically.

6. An accounting machine including an accumulating mechanism, means for entering items in said accumulating mechanism under control of perforated records representing one class of items by direct numbers and from perforated records representing another class of items by the tens complement to effect adding and subtracting operations of by complemental method, and means controlled by the accumulating mechanism for manifesting a balance as a true number from either a true or complementary result on said accumulating mechanism.

7. In a machine of the class described, a credit balance accumulator, a debit balance accumulator, said accumulators being arranged to initially represent a units difference in value, means for entering in both accumulators items of one class as direct numbers and items of another class as tens complements, respectively, whereby when the items of one class exceed the items of the other class the balance will be represented correctly on one accumulator, and incorrectly on the other, and means under control of the accumulator which is correct for printing a balance as a true number.

8. In a machine of the class described, a debit balance accumulator, a credit balance accumulator, means for entering debit items in both accumulators as direct numbers and credit items as tens complements respectively, said debit balance accumulator representing a debit balance as a true number when the debit items exceed the credit items, and the credit balance accumulator representing the nines complement of the credit balance as a true number when the credit items numerically exceed the debit items, a plurality of sets of printing devices, the type on one set being arranged in a nines complementary relation with the type of the other set of printing devices, and means whereby the balance on one accumulator is printed by one of the said sets of printing devices as a true number when a debit balance condition occurs or a balance on the other accumulator is printed as a true result by the other set of printing devices when a credit balance condition occurs.

9. In a machine of the class described, the combination with debit and credit balance accumulators, means for entering items of one class in both accumulators as direct numbers and items of the other class as complements of the numbers, whereby when the items of one class exceed the items of the other class the balance will be exhibited correctly on one accumulator and incorrectly on the other but both as positive or true numbers, and means under control of the accumulator which is correct for printing a true debit balnce.

10. In a machine of the class described, a debit balance accumulator, a credit balance accumulator, the accumulators being arranged to represent initially a units difference in value, means for entering in both accumulators items of one class as direct numbers and items of another class as complements of the numbers whereby when the credit items are greater numerically a tens complement of the true number representing a credit balance will be exhibited on the debit balance accumulator and a nines complement thereof on the credit balance accumulator, two sets of printing devices the type of one set being arranged in a nine complementary relationship with the type on the other set, and means whereby one of the sets of type is selected for a printing operation when the credit balance accumulator exhibits a nines complement.

11. An accounting machine including an accumulating mechanism, means for additively and subtractively entering items in said accumulating mechanism to add and subtract, printing mechanism controlled by said accumulating mechanism and comprising two sets of printing devices, the type of one set being complementally arranged with respect to the type of the other set of devices, and means controlled by the accumulating mechanism for selecting one or the other of said sets of devices for a printing operation in accordance with whether said accumulating mechanism represents a positive or negative condition.

12. An accounting machine including an accumulating mechanism, means for additively and subtractively entering items in said accumulating mechanism to add and subtract, printing mechanism comprising two sets of printing devices the type of one set being complementally arranged with respect to the type of the other set, a pair of selecting devices, one for selecting one set of type and the other for selecting the other set of type, and means controlled by the accumulating mechanism for rendering either one or the other of said selecting devices operable depending upon whether the accumulating mechanism exhibits a positive or negative condition.

13. An accounting machine including an accumulating mechanism and means for additively and subtractively entering items in said accumulating mechanism to add and subtract a printing mechanism comprising two sets of printing devices, the type of one set being arranged complementally with respect to the type of the other set, and a pair of electrical control devices one or the other being automatically effective to select a related set of type in dependence on whether the accumulating mechanism exhibits a positive or negative condition.

14. In a machine for deriving positive and negative balances, two sets of means for indicating the balance of positive and negative items, one set normally represenating a units difference in value from the other set, and means for automatically converting to a true numerical result a negative balance represented on one of said sets as a nines complement.

15. An accounting machine comprising a pair of accumulators, means for additively and subtractively entering numbers in said accumulators to add and subtract, one accumulator always indicating a result less in value than the other irrespective whether the result is positive or negative, separate sets of printing devices, each set controlled by its respective accumulator, the type on one set being arranged complementally with respect to the type on the other set, and means controlled by the accumulators for selecting one of said sets of printing devices to represent as a true number the balance when one of the accumulators represents a true number, or the other of said sets when the other accumulator represents a balance as a complement of the true number.

In testimony whereof I hereto affix my signature.

HERMANN ADALBERT WEINLICH.